(12) United States Patent
Kim et al.

(10) Patent No.: US 8,858,011 B2
(45) Date of Patent: Oct. 14, 2014

(54) BACKLIGHT UNIT AND DISPLAY APPARATUS USING THE SAME

(75) Inventors: Min Sang Kim, Seoul (KR); Jung In Seo, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 256 days.

(21) Appl. No.: 13/368,673

(22) Filed: Feb. 8, 2012

(65) Prior Publication Data
US 2012/0140443 A1    Jun. 7, 2012

(30) Foreign Application Priority Data

Jul. 29, 2011    (KR) .................. 10-2011-0076205

(51) Int. Cl.
*G09F 13/04*    (2006.01)
*F21V 8/00*    (2006.01)

(52) U.S. Cl.
CPC ............ *G02B 6/0021* (2013.01); *G02B 6/0055* (2013.01); *G02B 6/0068* (2013.01); *G02B 6/0073* (2013.01); *G02B 6/0038* (2013.01)
USPC ........... 362/97.3; 362/612; 362/615; 362/616

(58) Field of Classification Search
USPC ............... 362/97.1–97.3, 234, 612, 613, 615, 362/616, 628
See application file for complete search history.

(56) References Cited

U.S. PATENT DOCUMENTS

2007/0147023 A1 * 6/2007 Matsushita ...................... 362/97

* cited by examiner

*Primary Examiner* — Meghan Dunwiddie
(74) *Attorney, Agent, or Firm* — Birch, Stewart, Kolasch & Birch, LLP (57) ABSTRACT

The backlight unit includes a plurality of light source groups, each of which includes at least one light source, and a light guide plate to guide light irradiated from the plurality of light source groups, and the light guide plate includes first grooves disposed in a first direction, the plurality of light source groups being disposed within the first grooves, and at least one second groove disposed in a second direction differing from the first direction.

20 Claims, 11 Drawing Sheets

BACKLIGHT UNIT AND DISPLAY APPARATUS USING THE SAME

CROSS REFERENCE TO RELATED APPLICATION

This application claims priority under 35 U.S.C. §119 to Korean Patent Application No. 10-2011-0076205 filed in Korea on Jul. 29, 2011 which is hereby incorporated in its entirety by reference as if fully set forth herein.

TECHNICAL FIELD

Embodiments relate to a backlight unit and a display apparatus using the same.

BACKGROUND

Recently, as a display apparatus, a liquid crystal display (LCD) or a plasma display panel (PDP) is used. Differently from the PDP of a self-emitting type, the LCD essentially requires a separate backlight unit due to absence of self-emitting light emitting devices.

As light sources of the backlight unit used in the LCD, cold cathode fluorescent lamps (CCFLs) are widely used. However, the backlight unit using the CCFLs may consume a considerable amount of power because power is applied to the CCFLs at all times, exhibit a color reproduction rate of about 70% that of a CRT, and cause environmental pollution due to addition of mercury.

In order to solve these problems, research into a backlight unit using light emitting diodes (LEDs) has been underway.

If LEDs are used for the backlight unit, an LED array may be partially turned on/off and thus power consumption may be considerably reduced. Particularly, RGB LEDs exceed 100% of national television system committee (NTSC) color reproduction range specifications, thus providing a more vivid image to consumers.

However, the related backlight unit does not uniformly guide light, and thus hot spots and dark regions may be generated.

SUMMARY

Embodiments provide a backlight unit which improves generation of hot spots and dark regions, and a display apparatus using the same.

In one embodiment, a backlight unit includes a plurality of light source groups, each of which includes at least one light source, and a light guide plate to guide light irradiated from the plurality of light source groups, wherein the light guide plate includes first grooves disposed in a first direction, the plurality of light source groups being disposed within the first grooves, and at least one second groove disposed in a second direction differing from the first direction.

The first grooves may be disposed on the lower surface of the light guide plate, and the second direction may be perpendicular to the first direction. The backlight unit may further include optical member disposed on the front surface of the light guide plate, and the second direction may be perpendicular to a direction in which the optical member is seen.

The at least one light source may include a plurality of light sources, and the at least one second groove may be disposed at portion of the light guide panel overlapping in the second direction with region between the plurality of light sources in each of the plurality of light source groups.

The at least one second groove may be disposed at portion of the light guide plate overlapping in the second direction with region between the plurality of light source groups.

Each of the plurality of light source groups may include a circuit board and a plurality of light sources disposed on the circuit board. Further, the at least one second groove may be disposed at portion of the light guide plate overlapping in the second direction with region between light sources located at the respective edges of the plurality of adjacent light source groups. Further, The at least one second groove may be disposed at portion of the light guide plate overlapping in the second direction with region between the circuit boards of the plurality of adjacent light source groups.

The plurality of light source groups may include a circuit board and a plurality of light sources divided from each other on the circuit board according to local dimming units. The at least one second groove may be disposed at portion of the light guide plate overlapping in the second direction with region between light sources located at the edges of the adjacent local dimming units.

The plurality of light source groups may include a plurality of sub-circuit boards and a plurality of light sources disposed on each of the plurality of sub-circuit boards, and the plurality of sub-circuit boards may be disposed on a main circuit board. Further, the at least one second groove may be disposed at portion of the light guide plate overlapping in the second direction with region between light sources located at the respective edges of the adjacent sub-circuit boards. The at least one second groove may be disposed at portion of the light guide plate overlapping in the second direction with region between the adjacent sub-circuit boards.

The backlight unit may further include a bottom cover disposed under the light guide plate, and brackets attached to the bottom cover to fix the plurality of light source groups.

A ratio of the depth to the width of the at least one second groove may be 3:1 to 2:1, the width of the at least one second groove may be 5.375 mm or less, and the at least one second groove may have a circular cross-section, an oval cross-section or a polygonal cross-section.

The at least one second groove may have a circular cross-section, and have a radius adapted to refract in the second direction light irradiated from the plurality of light source groups.

Further, the at least one second groove may have a triangular cross-section, and the central angle of the at least one second groove is 30° or less.

The at least one second groove may include first and second inclined planes meeting at an inflection point. The first and second inclined planes may be convex or concave with respect to the inside of the at least one second groove. Further, the first and second inclined planes may have a curvature adapted to refract in the second direction light irradiated from the plurality of light source groups.

BRIEF DESCRIPTION OF THE DRAWINGS

Arrangements and embodiments may be described in detail with reference to the following drawings in which like reference numerals refer to like elements and wherein:

FIGS. 9(a) to 9(c) are views illustrating various cross-sections of second grooves in accordance with embodiments;

DESCRIPTION OF SPECIFIC EMBODIMENTS

Hereinafter, embodiments will be described with reference to the annexed drawings.

It will be understood that when an element is referred to as being 'on' or "under" another element, it can be directly on/under the element, and one or more intervening elements may also be present. When an element is referred to as being 'on' or 'under', 'under the element' as well as 'on the element' can be included based on the element.

In the drawings, the thicknesses or sizes of respective components may be exaggerated, omitted or schematically illustrated for convenience and clarity of description.

Figure 1:
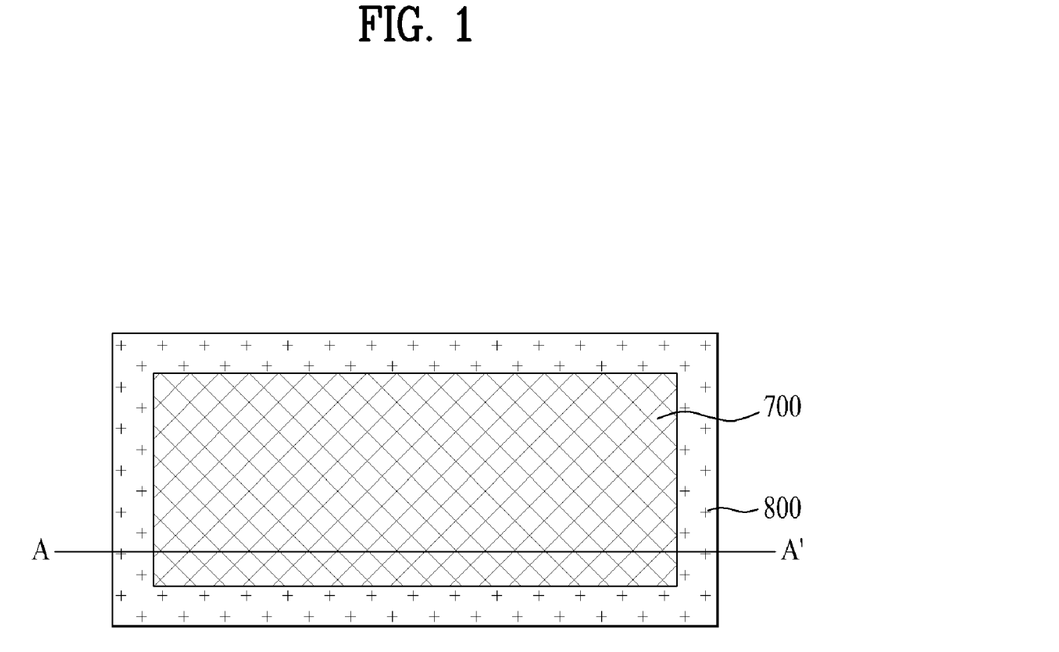
FIG. 1 is a schematic plan view of the entirety of a backlight unit in accordance with one embodiment.
Figure 2:
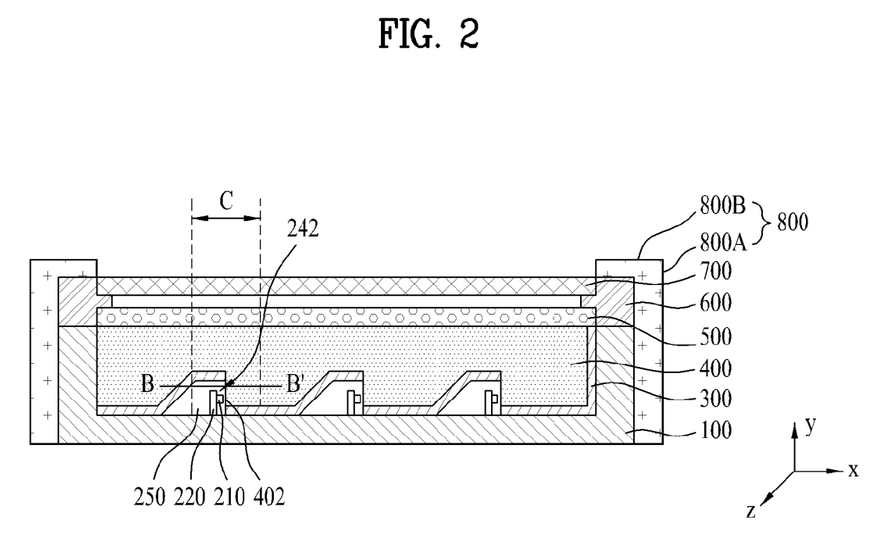
FIG. 2 is a cross-sectional view of the backlight unit taken along the line A-A' of FIG. 1.
Figure 3:
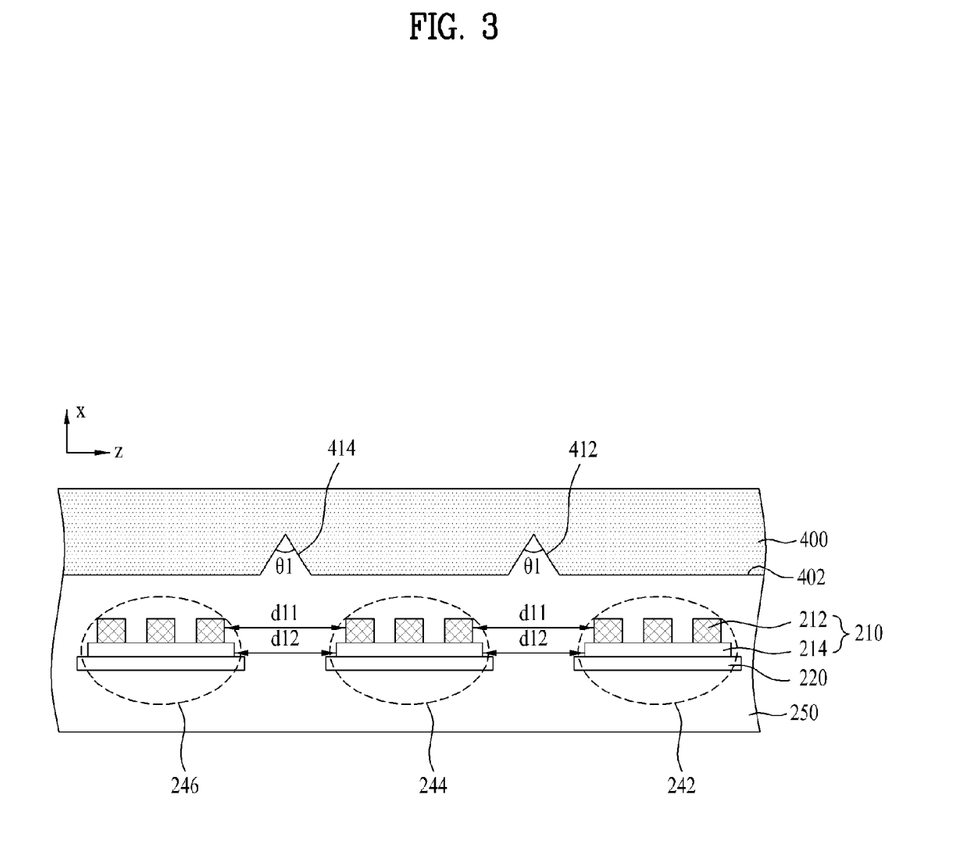
FIG. 3 is a partial plan view of the backlight unit taken along the line B-B' of FIG. 2 and then seen from the portion C.

FIG. 1 is a schematic plan view of the entirety of a backlight unit in accordance with one embodiment, FIG. 2 is a cross-sectional view of the backlight unit taken along the line A-A' of FIG. 1, and FIG. 3 is a partial plan view of the backlight unit taken along the line B-B' of FIG. 2 and then seen from the portion C.

In FIG. 3, in order to divide plural light source groups 210 disposed in a first direction (the 'z' direction) from each other, the respective light source groups 210 are represented by reference numerals 242, 244 and 246.

With reference to FIGS. 1 to 3, the backlight unit includes a bottom cover (or, a bottom chassis) 100, the plural light source groups (or, light source modules) 210, brackets 220, a reflector 300, a light guide plate 400, an optical member 500, and a panel guide 600.

The bottom cover 100 accommodates the light source groups 210, the brackets 220, the reflector 300, the light guide plate 400 and the optical member 500. For example, the bottom cover 100 may be formed of a metal selected from among the group consisting of aluminum, zinc, copper, iron, stainless steel and alloys thereof. Namely, the reflector 300, the light guide plate 400 and the optical member 500 may be supported by the bottom cover 100.

The light source groups 210 are disposed opposite to a light incidence plane 402 of the light guide plate 400. Each light source group 210 may include a circuit board 214 and at least one light source 212 disposed on the circuit board 214. The circuit board 214 and the at least one light source 212 may be disposed within a first groove 250 on the light guide plate 400.

Plural light sources 212 may be separated from each other and mounted on the circuit board 214 and irradiate light onto the light incidence plane 402 of the light guide plate 400. For example, the light sources 212 may contact the light incidence plane 402 of the light guide plate 400 or may be separated from the light incidence plane 402 by a predetermined distance, and the disclosure is not limited thereto.

Here, the plural light sources 212 mounted on the circuit board 214 may be disposed in parallel, or may be disposed in plural columns in parallel on the circuit board 214.

Further, each light source 212 includes a light emitting device, and for example, may include an LED or an LED package. The light source 212 may be a side view type LED. According to circumstances, the light source 212 may be a top view type LED. The light source 212 may be an LED chip, and the LED chip may be a blue LED chip or an ultraviolet LED chip, or a package in which at least one of a red LED chip, a green LED chip, a blue LED chip, a yellow green LED chip and a white LED chip are combined.

Here, the white LED may be produced by combining a yellow phosphor with a blue LED, by using both a red phosphor and a green phosphor on a blue LED, or by using a yellow phosphor, a red phosphor and a green phosphor on a blue LED.

The circuit board 214 may include an electrode pattern to be electrically connected to the light sources 212, and may be a printed circuit board (PCB) formed of one selected from the group consisting of polyethylene terephthalate (PET), glass, polycarbonate (PC) and silicon (Si), or be formed in a film type.

Further, the circuit board 214 may selectively employ a single layer PCB, a multi-layer PCB, a ceramic substrate, a metal core PCB, etc.

Here, the circuit board 214 may be a printed circuit board, and be attached to the bracket 220.

The bracket 220 is attached to the bottom cover 100 within the first groove 250 and supports the light sources 212 and the circuit board 214, and the light guide plate 400 may be disposed on the bracket 200. Further, the bracket 220 may emit heat generated from the light source group 210.

Although the embodiment shown in FIG. 2 exemplarily illustrates a direct type backlight unit in which the light source groups 210 are disposed under a liquid crystal display panel 700 to illuminate the front surface of the panel 700, the disclosure is not limited thereto.

The reflector 300 reflects light emitted from the rear surface of the light guide plate 400 to be incident back upon the light guide plate 400. For this purpose, the reflector 300 may be attached to the overall surface of the bottom cover 100. Namely, the reflector 300 is disposed between the bottom cover 100 and the light guide plate 400, and extends from the lower surface to the lateral surface of the light guide plate 400.

In FIG. 2, the reflector 300 may be disposed on at least one of the lateral surfaces and the bottom surfaces of the first grooves 250 of the light guide plate 400.

Here, the reflector 300 may be formed of at least one of a metal or a metal oxide, and for example, may be formed of a metal or a metal oxide having high reflexibility, such as aluminum (Al), silver (Ag), gold (Au) or titanium dioxide ($TiO_2$).

The optical member 500 is disposed on the upper surface of the light guide plate 400 and improves optical characteristics of light. Namely, the optical member 500 attached to the front surface of the light guide plate 400 serves to diffuse light emitted through the light guide plate 400. In order to increase diffusion effects, the optical member 500 may have an uneven pattern disposed on the upper surfaces thereof.

Further, the optical member 500 may include several layers, and the uneven pattern may be disposed on the surface of the uppermost layer or one layer. The uneven pattern may have a stripe shape disposed along the light source groups 210.

Here, the uneven pattern includes protrusions protruding from the surface of the optical member 500, and the protrusions include first planes and second planes opposite to each other. An angle between the first plane and the second plane may be obtuse or acute.

According to circumstances, the optical member 500 may include at least one sheet, e.g. may selectively include a diffusion sheet, a prism sheet, a brightness enhancement sheet, etc. A more detailed description of the optical member 500 will be given later.

The panel guide 600 is disposed to surround the lateral surface of the bottom cover 100 and the edge of the front surface of the optical member 500 to support the liquid crystal display panel 700, and is provided with an opening to expose the optical member 500.

A top cover (or, a top chassis) 800 includes a vertical part 800A contacting the outer surface of the lateral surface portion of the bottom cover 100, and an upper end edge part 800B extending inwards from the vertical part 800A. Here, a portion of the top cover 800 at the inside of the upper end edge part 800B forms the opening to expose the optical member 500.

The light guide plate 400 is disposed throughout the front surfaces of the bottom cover 100 and the reflector 300, and receives light irradiated from the light source groups 210 and guides the received light in a designated direction. Namely, the light guide plate 400 converts linear light emitted from the light source groups 242, 244 and 246 into surface light, and transmits the surface light to the liquid crystal display panel 700.

Further, the light guide plate 400 may include at least one first groove 250 disposed on the lower surface of the light guide plate 400 in the first direction (the 'z' direction), as shown in FIG. 2. The first grooves 250 may have a triangular, rectangular, or trapezoidal cross-section. If the first grooves 250 have a trapezoidal cross-section, from among first lateral surfaces and second lateral surfaces of the first groove 250 opposite to each other, the first lateral surface of the first groove 250 may be perpendicular to the bottom surface of the first groove 250, and the second lateral surface of the first groove 250 may be inclined with respect to the bottom surface of the first groove 250.

Otherwise, if the first grooves 250 of the light guide plate 400 have a trapezoidal cross-section, the first and second lateral surfaces of the first groove 250 opposite to each other may be inclined with respect to the bottom surface of the first groove 250, and an angle between the first lateral surface and the bottom surface of the first groove 250 may be smaller than an angle between the second lateral surface and the bottom surface of the first groove 250.

Further, if the first grooves 250 of the light guide plate 400 have a triangular cross-section, from among first surfaces and second lateral surfaces opposite to each other meeting at a peak point, the first lateral surface of the first groove 250 is perpendicular to a horizontal plane that is parallel with the upper surface of the light guide plate 400, and the second lateral surface of the first groove 250 may be inclined with respect to the horizontal plane that is parallel with the upper surface of the light guide plate 400. Here, an angle between the first lateral surface and the second lateral surface opposite to each other may be about 30° to 120°.

The light guide plate 400 may be formed of a transparent material, for example, one selected from among the group consisting of acrylic resins, such as polymethylmethacrylate (PMMA), polyethylene terephthalate (PET), cyclic olefin copolymers (COCs), polyethylene naphthalate (PEN), polycarbonate (PC), polystyrene (PS) and methacrylate styrene (MS) resins. Further, in order to uniformly reflect light, plural dots or V-shaped holes (not shown) may be formed on the upper or lower surface of the light guide plate 400.

In accordance with the embodiment, in order to uniformly reflect light, the light guide plate 400 may include a single second groove or plural second grooves at portions of the light guide plate 400 overlapping in a second direction (the 'x' direction) with regions between the plural light source groups 210 or between the plural light sources within each light source group 210. The second grooves are disposed in the second direction on the light incidence plane 402 of the light guide plate 400 upon which light generated from the light source groups 210 or the light sources is incident.

For example, as shown in FIG. 3, second grooves 412 and 414 may be disposed on the light incidence plane 402 of the light guide plate 400 at portions thereof overlapping in the second direction (the 'x' direction) with regions between the plural light source groups 242, 244 and 246.

Figure 8:
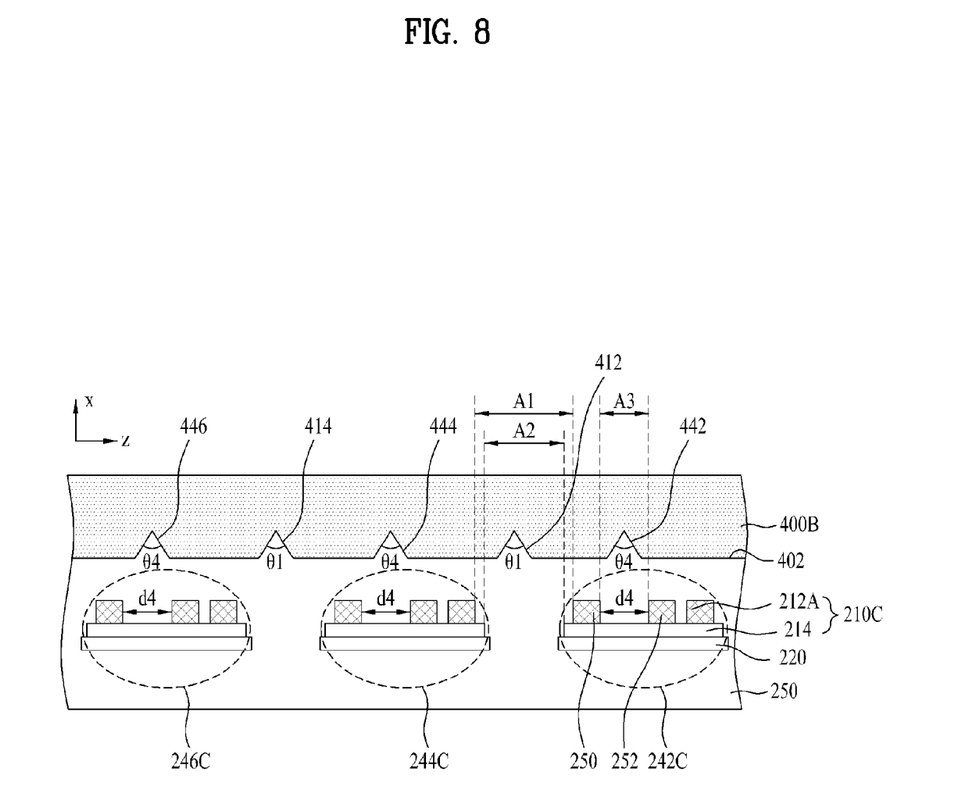
FIG. 8 is a partial plan view of a backlight unit in accordance with still another embodiment seen from the portion C of FIG. 2.

Further, as shown in FIG. 8, one second groove or plural second grooves 442, 444 and 446 may be disposed on the light incidence plane 402 at portions thereof overlapping in the second direction (the 'x' direction) with regions between the plural light sources 212 within each of light source groups 242C, 244C and 246C.

Here, the second direction differs from the first direction (the 'z' direction), and for example, may be a direction (the 'x' direction) perpendicular to the first direction (the 'z' direction). Further, the second direction may be perpendicular to a direction (the 'y' direction) in which the optical member 500 is seen.

With reference to FIG. 3, each of the light source groups 242, 244 and 246 includes the plural light sources 212 and the circuit board 214, and is supported by the bracket 220.

Figure 4:
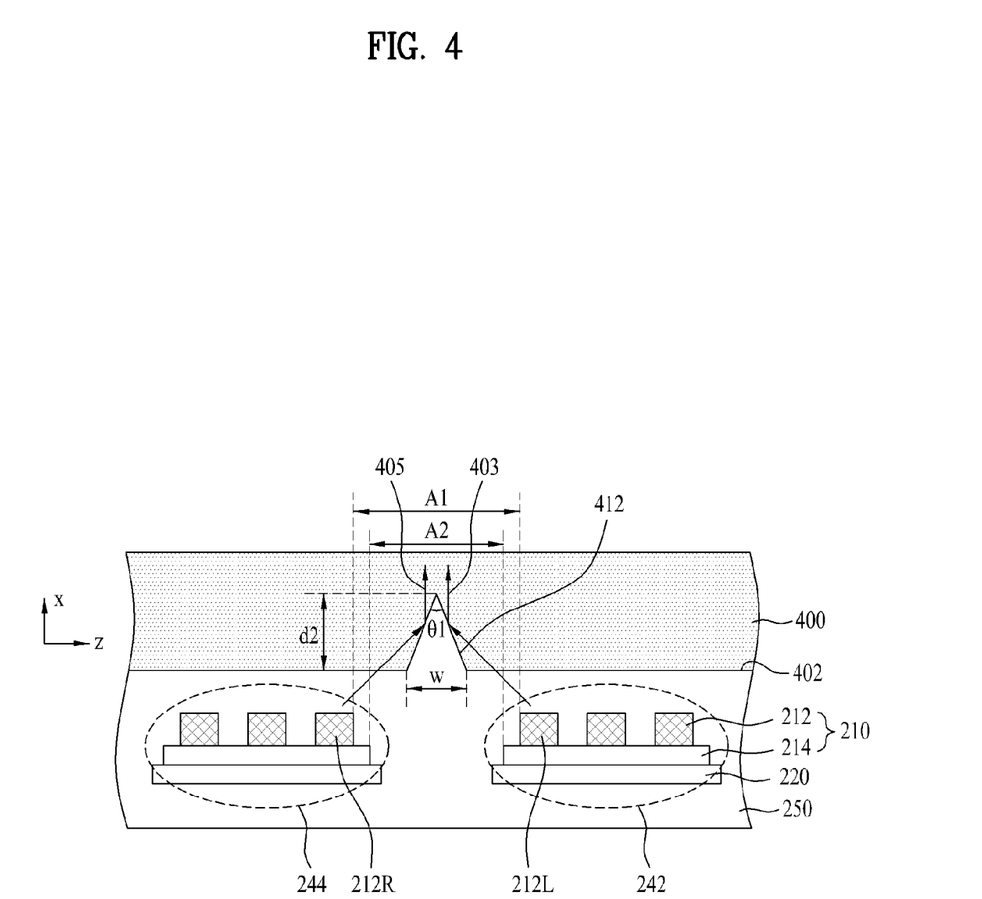
FIG. 4 is an enlarged cross-sectional view illustrating two adjacent light source groups shown in FIG. 3.

FIG. 4 is an enlarged cross-sectional view illustrating the two adjacent light source groups 242 and 244 shown in FIG. 3. Although FIG. 4 illustrates only the light source groups 242 and 244 and the second groove 412, a description thereof will be equally applied to other adjacent light source groups 244 and 246 and the second groove 414.

With reference to FIG. 4, the second groove 412 is disposed at a portion A1 or A2 of the light incidence plane 402 of the light guide plate 400 overlapping in the second direction (the 'x' direction) with a region between the two adjacent light source groups 242 and 244. Similarly, the second groove 414 is disposed at a portion of the light incidence plane 402 of the light guide plate 400 overlapping in the second direction (the 'x' direction) with a region between the two adjacent light source groups 244 and 246.

In accordance with the embodiment, the second groove 412 may be disposed at the portion A1 overlapping in the second direction (the 'x' direction) with a region between the leftmost light source 212L of the light source group 242 and the rightmost light source 212R of the light source group 244.

Otherwise, the second groove 412 may be disposed at the portion A2 overlapping in the second direction (the 'x' direction) with a region between the circuit board 214 of the light source group 242 and the circuit board 214 of the light source group 244.

Here, the light source groups 242, 244 and 246 or the light sources 212 of the respective light source groups 242, 244 and 246 do not overlap with the second grooves 412 and 414 in the perpendicular direction. Here, the perpendicular direction means the second direction (the 'x' direction) perpendicular to the light incidence plane 402 of the light guide plate 400 from the centers of the respective light sources 212. Namely, the light sources 212 and the light source groups 242, 244 and 246 are not present at regions of the first grooves 250 overlapping with the second grooves 412 and 414 in the second direction (the 'x' direction).

With reference to FIG. 4, light generated from the light sources 212L and 212R located at the edges of the adjacent light source groups 242 and 244 is reflected by the second groove 412 disposed on the light guide plate 400, thus generating light paths 403 and 405 having straightness. In the same manner, light generated from the light sources located at the edges of the adjacent light source groups 244 and 246 is reflected by the second groove 414 disposed on the light guide plate 400, thus generating light paths having straightness.

In accordance with the embodiment, the plural light source groups 242, 244 and 246 may be separated from each other by a predetermined distance. Here, the predetermined distance between the light source groups 242, 244 and 246 may be set as a distance d11 between the light sources located at the edges from among the light sources of the adjacent light source groups 242 and 244, or 244 and 246, or be set as a distance d12 between the circuit boards 214 of the adjacent light source groups 242 and 244, or 244 and 246.

For example, the predetermined distance d11 or d12 between the light source groups 242 and 244 shown in FIGS. 3 and 4 may be set to 5.375 mm, and the width w of the second groove 412 may be set to a value of 5.375 mm or less. Further, the predetermined distance d11 or d12 between the light source groups 244 and 246 shown in FIG. 3 may be set to 5.375 mm, and the width w of the second groove 414 may be set to a value of 5.375 mm or less.

Further, in accordance with the embodiment, a ratio of the depth d2 to the width w of the second groove 412 or 414 may be 3:1 to 2:1.

Further, a central angle $\theta 1$ of the second groove 412 or 414 may be set to 30° or less.

As described above, the second grooves 412 or 414 disposed on the light guide plate 400 effectively collects light incident from the adjacent light source groups 242 and 244 or 244 and 246. Namely, the second groove 412 or 414 reflects light incident from the light sources disposed at the edges of the two adjacent light source groups 242 and 244 or 244 and 246, thereby reducing hot spots or dark regions generated due to non-uniformity of light incident from the separated light source groups 242 and 244 or 244 and 246.

Figure 5:
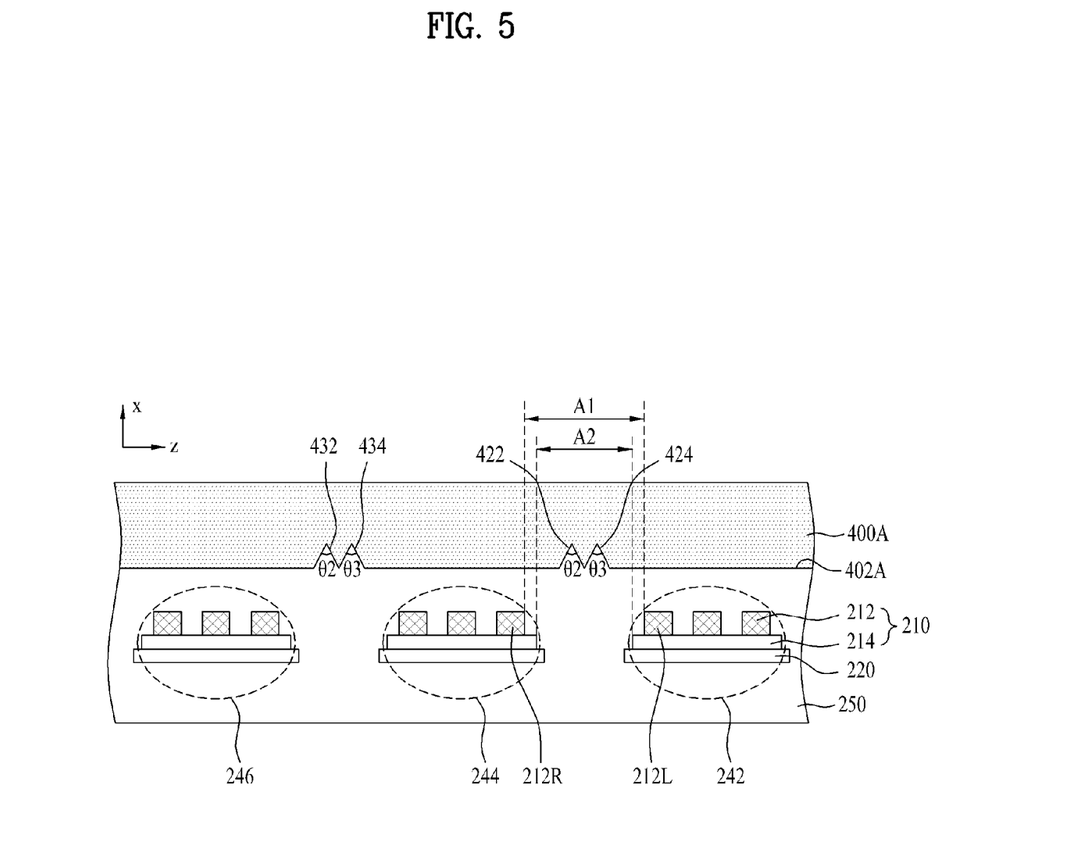
FIG. 5 is a partial plan view of a backlight unit in accordance with another embodiment seen from the portion C of FIG. 2.

FIG. 5 is a partial plan view of a backlight unit in accordance with another embodiment seen from the portion C of FIG. 2. The backlight unit shown in FIG. 5 is the same as the backlight unit shown in FIG. 3 excluding that plural second grooves are disposed at each of corresponding portions A1 and A2 of the light guide plate 400.

With reference to FIG. 5, plural second grooves 422 and 424 may be disposed at a portion A1 or A2 of the light guide plate 400 overlapping with a region between the adjacent light source groups 242 and 244 in the second direction (the 'x' direction).

Namely, the plural second grooves 422 and 424 may be disposed at the portion A1 of the light guide plate 400 overlapping in the second direction (the 'x' direction) with a region between the leftmost light source 212L of the light source group 242 and the rightmost light source 212R of the light source group 244. Otherwise, the plural second grooves 422 and 424 may be disposed at the portion A2 of the light guide plate 400 overlapping in the second direction (the 'x' direction) with a region between the circuit board 214 of the light source group 242 and the circuit board 214 of the light source group 244.

Further, plural second grooves 432 and 434 may be disposed at a portion A1 or A2 of the light guide plate 400 overlapping in the second direction (the 'x' direction) with a region between the adjacent light source groups 244 and 246. Although FIG. 5 illustrates two second grooves 422 and 424 or 432 and 434 as being disposed at the corresponding portion A1 or A2 of the light guide plate 400, this embodiment is not limited thereto and three or more second grooves may be disposed at the corresponding portion A1 or A2 of the light guide plate 400.

In accordance with the embodiment, central angles $\theta 2$ and $\theta 3$ of the second grooves 422 and 424 or 432 and 434 shown in FIG. 5 may be equal or different. Further, the central angles $\theta 2$ and $\theta 3$ may be equal to or different from the central angle $\theta 1$.

The plural light sources of each light source group 210 or the plural light source groups 210 may be divisionally driven according to regions. For example, the plural light sources of one light source group may be divided according to local dimming units, and may be divisionally driven according to local dimming units. Further, the plural light source groups separated from each other may be divisionally driven according to regions.

Figure 6:
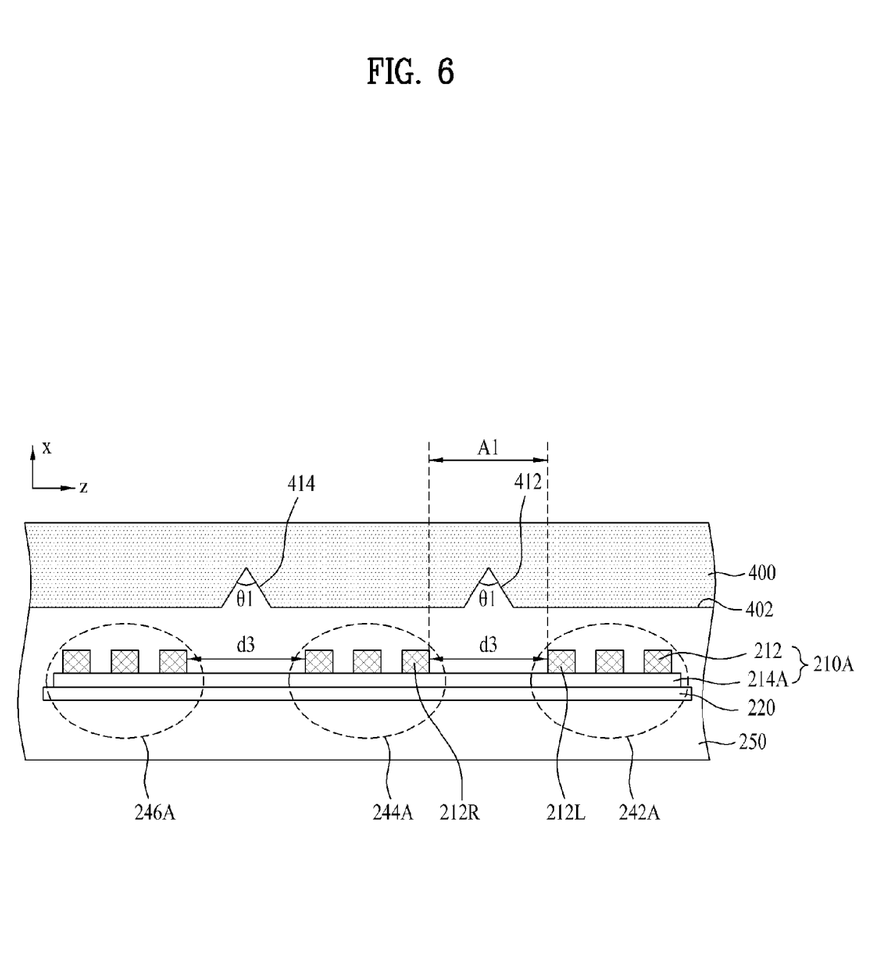
FIG. 6 is a partial plan view of a backlight unit in accordance with still another embodiment seen from the portion C of FIG. 2.

FIG. 6 is a partial plan view of a backlight unit in accordance with still another embodiment seen from the portion C of FIG. 2.

In FIG. 6, in order to divide plural light source groups 210A disposed in the first direction (the 'z' direction) from each other, the respective light source groups 210A are represented by reference numerals 242A, 244A and 246A.

With reference to FIG. 6, the light source groups 210A include plural light sources 212 and one circuit board 214A. Specifically, the plural light source groups 242A, 244A and 246A include one circuit board 214A in common. The plural light sources 121 may be divided on the circuit board 214A according to local dimming units, and be divisionally driven according to local dimming units. The respective local dimming units 242A, 244A and 246A may be separated from each other by a predetermined distance d3.

For example, the second groove 412 is disposed at a portion A1 of the light guide plate 400 overlapping in the second direction (the 'x' direction) with a region between light sources 212L and the 212R located at the respective edges of the adjacent light source groups 242A and 244A of the local dimming units. Namely, the second groove 412 may be disposed at the portion A1 of the light guide plate 400 overlapping in the second direction (the 'x' direction) with a region between the leftmost light source 212L of the light source group 242A and the rightmost light source 212R of the light source group 244A. Further, another second groove 414 may be disposed at a portion A1 of the light guide plate 400 overlapping in the second direction (the 'x' direction) with a region between light sources located at the respective edges of the adjacent light source groups 244A and 246A.

Of course, plural second grooves, as shown in FIG. 5, may be disposed at the portion A1 of FIG. 6.

As described above, the backlight unit in which the plural light source groups 210A are divisionally driven according to local dimming units may reduce hot spots or dark regions.

Figure 7:
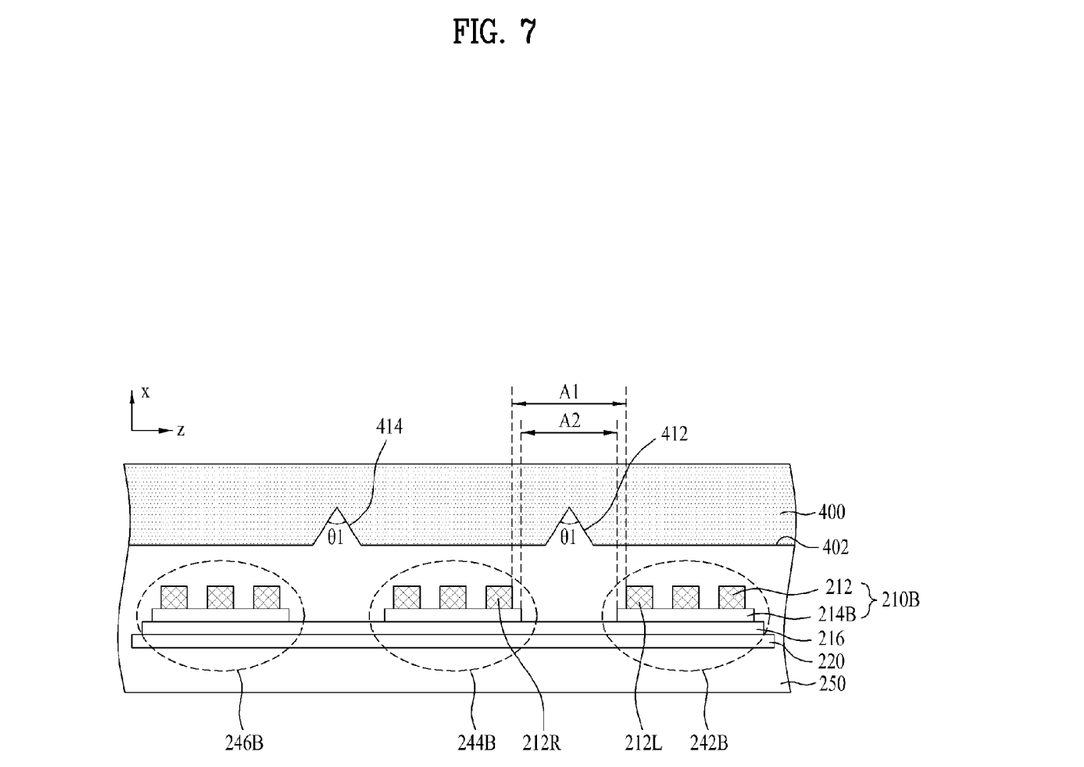
FIG. 7 is a partial plan view of a backlight unit in accordance with still another embodiment seen from the portion C of FIG. 2.

FIG. 7 is a partial plan view of a backlight unit in accordance with still another embodiment seen from the portion C of FIG. 2.

In FIG. 7, in order to divide plural light source groups 210B disposed in the first direction (the 'z' direction) from each other, the respective light source groups 210B are represented by reference numerals 242B, 244B and 246B.

With reference to FIG. 7, each of the light source groups 210B includes plural light sources 212 and one sub-circuit board 214B. Specifically, each of the plural light source groups 242B, 244B and 246B includes one sub-circuit board 214B and the plural light sources 212. Here, the plural sub-circuit boards 214B are disposed on one main circuit board 216, and the plural light sources 212 are disposed on each of the sub-circuit boards 214B.

In this case, second grooves 412 and 414 are disposed at portions A1 or A2 of the light guide plate 40 overlapping in the second direction (the 'x' direction) with regions between the adjacent light source groups 242B and 244B and between the adjacent light source groups 244B and 244B.

Namely, the second groove 412 is disposed at the portion A1 of the light guide plate 400 overlapping in the second direction (the 'x' direction) with a region between the leftmost light source 212L on the sub-circuit board 214B of the light source group 242B and the rightmost light source 212R on the sub-circuit board 214B of the light source group 244B. Further, the second groove 414 is disposed at the portion A1 of the light guide plate 400 overlapping in the second direction (the 'x' direction) with a region between the leftmost light source of the light source group 244B and the rightmost light source of the light source group 246B.

Otherwise, the second groove 412 may be disposed at the portion A2 of the light guide plate 400 overlapping in the second direction (the 'x' direction) with a separation region between the sub-circuit board 214B of the light source group 242B and the sub-circuit board 214B of the light source group 244B. Further, the second groove 414 may be disposed at the portion A2 of the light guide plate 400 overlapping in the second direction (the 'x' direction) with a separation region between the sub-circuit board 214B of the light source group 244B and the sub-circuit board 214B of the light source group 246B.

FIG. 8 is a partial plan view of a backlight unit in accordance with still another embodiment seen from the portion C of FIG. 2. The backlight unit shown in FIG. 8 is the same as the backlight unit shown in FIG. 3 excluding that a distance between adjacent light sources 250 and 252 in the backlight unit shown in FIG. 8 differs from the distance between the adjacent light sources in the backlight unit shown in FIG. 3 and plural second grooves 442, 444 and 446 are further disposed at corresponding portions A3 of the light guide plate 400.

In FIG. 8, in order to divide the plural light source groups 210C disposed in the first direction (the 'z' direction) from each other, the respective light source groups 210C are represented by reference numerals 242C, 244C and 246C.

With reference to FIG. 8, each of the light source groups 210C includes plural light sources 212A and one circuit board 214. Namely, each of the light source groups 242C, 244C and 246C includes the plural light sources 212A and the one circuit board 214.

The separation distance d4 between the plural light sources 250 and 252 in each of the light source groups 242C, 244C and 246C shown in FIG. 8 is greater than the separation distance between the plural light sources in each of the light source groups shown in FIGS. 3 to 7.

In this case, second grooves 412 and 414 are disposed at portions A1 or A2 of the light guide plate 400 overlapping in the second direction (the 'x' direction) with regions between the light source groups 242C and 244C and between the light source groups 244C and 246C, and second grooves 442, 444 and 446 are disposed at portions of the light guide plate 400 overlapping in the second direction (the 'x' direction) with regions between the plural light sources 250 and 252 in each of the light source groups 242C, 244C and 246C.

Further, plural second grooves, as shown in FIG. 5, may be disposed at the portion A1 or A2 of the light guide plate 400 of FIG. 8.

Further, plural second grooves may be disposed at the portion A3 of the light guide plate 400 of FIG. 8.

In accordance with the embodiment, a central angle θ4 of the second grooves 442, 444 and 446 of FIG. 8 may be equal to or different from the central angles θ1, θ2, and θ3.

Further, if the circuit boards 214 of the respective light source groups 242C, 244C and 246C are integrated into one body, as shown in FIG. 6, the second grooves 412 and 414 may be disposed at portions of the light guide plate 400 overlapping in the second direction (the 'x' direction) with regions between the adjacent light source groups 242C, 244C and 246C of local dimming units on the light guide plate 400.

Even if the separation distance d4 between the plural light sources is great, as described above, the second grooves 442, 444 and 446 are disposed on the light guide plate 400, thereby preventing generation of hot spots and dark regions.

Figure 9:
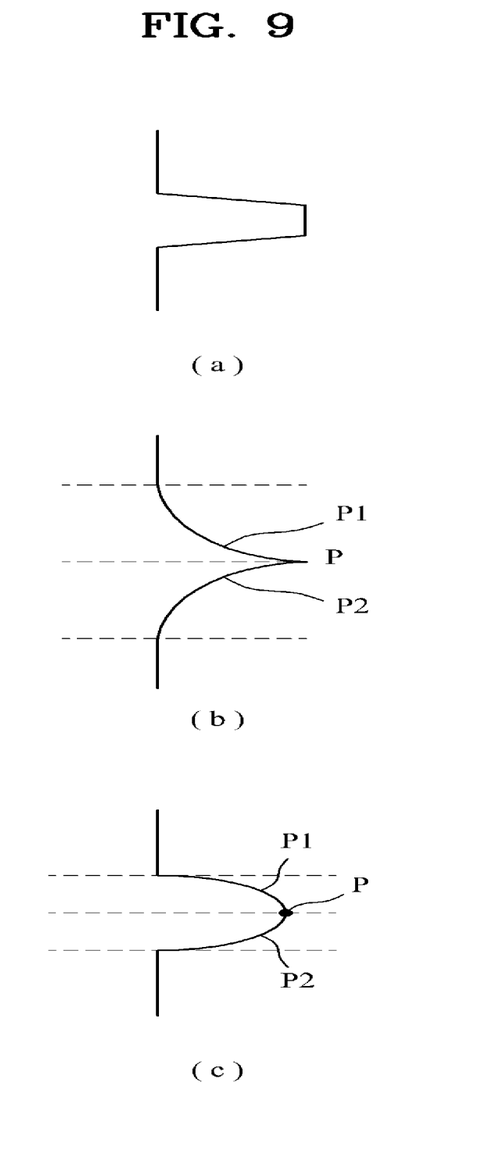

FIGS. 9(a) to 9(c) are views illustrating various cross-sections of second grooves disposed on the light incidence plane 402 of the light guide plate 400 in accordance with embodiments.

In accordance with one embodiment, the second grooves 412, 414, 422, 424, 432, 434, 442, 444 and 446 disposed on the light incidence plane 402 of the light guide plate 400 may have a triangular cross-section, as shown in FIGS. 3 to 8. However, the shape of the second grooves 412, 414, 422, 424, 432, 434, 442, 444 and 446 is not limited thereto.

In accordance with other embodiments, the second grooves 412, 414, 422, 424, 432, 434, 442, 444 and 446 may have a trapezoidal cross-section, as shown in FIG. 9(a), or may have an oval cross-section, as shown in FIG. 9(c). Besides, the second grooves 412, 414, 422, 424, 432, 434, 442, 444 and 446 may have a polygonal cross-section including a rectangular or diamond-shaped cross-section, or may have a circular cross-section.

Further, the second grooves 412, 414, 422, 424, 432, 434, 442, 444 and 446 may have a shape with at least one inclined plane which is inclined from the light incidence plane 402 to have a designated curvature. For example, the second grooves 412, 414, 422, 424, 432, 434, 442, 444 and 446 may have two adjacent inclined planes P1 and P2, i.e., first and second inclined planes P1 and P2, meeting at an inflection point P, as shown in FIGS. 9(b) and 9(c).

In accordance with these embodiments, the first inclined plane P1 and the second inclined plane P2 may be convex with respect to the insides of the second grooves 412, 414, 422, 424, 432, 434, 442, 444 and 446, as shown in FIG. 9(b), or may be concave with respect to the insides of the second grooves 412, 414, 422, 424, 432, 434, 442, 444 and 446, as shown in FIG. 9(c).

Further, the first inclined plane P1 and the second inclined plane P2 have a curvature adapted to refract in the second direction (the 'x' direction) light irradiated from the plural light sources 212, particularly from the rightmost and leftmost light sources 212R and 212L of the respective light source groups.

Further, if the second grooves 412, 414, 422, 424, 432, 434, 442, 444 and 446 have a circular cross-section, the second grooves 412, 414, 422, 424, 432, 434, 442, 444 and 446 have a radius adapted to refract in the second direction (the 'x' direction) light irradiated from the plural light sources 212, particularly from the rightmost and leftmost light sources 212R and 212L of the respective light source groups.

Figure 10:
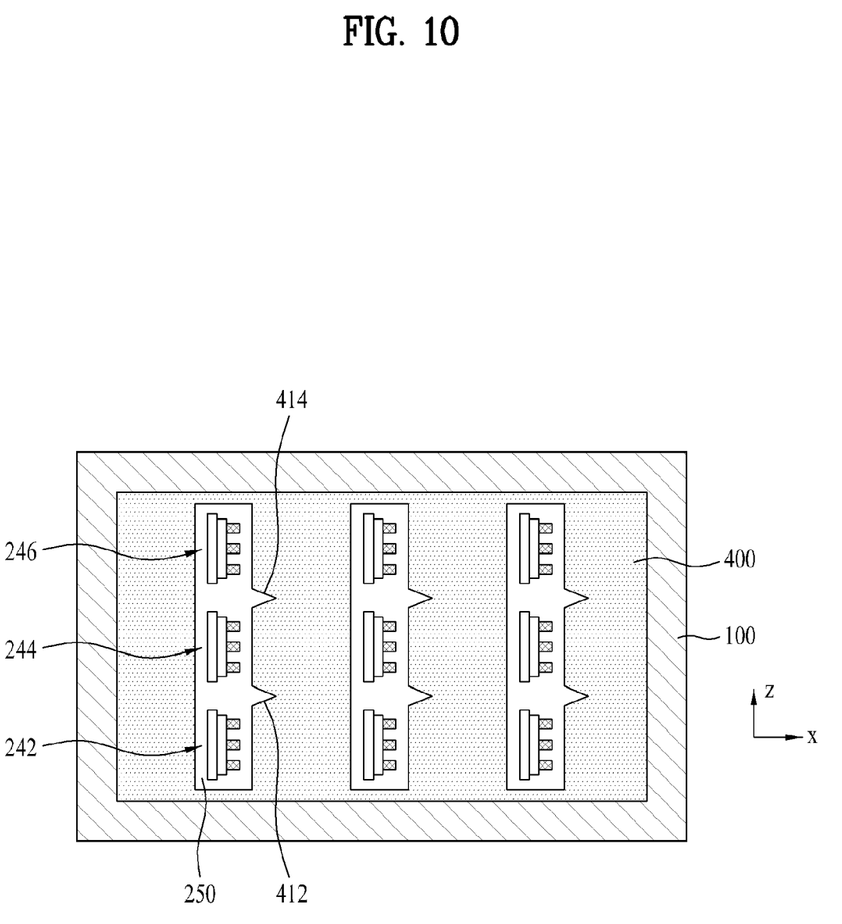
FIG. 10 is a plan view of the entirety of the backlight unit in accordance with the embodiment shown in FIG. 2.

FIG. 10 is a plan view of the entirety of the backlight unit in accordance with the embodiment shown in FIG. 2.

With reference to FIG. 10, the backlight unit in accordance with the embodiment includes the bottom cover 100, the plural light source groups 242, 244 and 246 separated from each other, and the light guide plate 400. The light guide plate 400 includes the first grooves 250 and the second grooves 412 and 414.

Here, the plural light source groups 242, 244 and 246 are disposed within the first grooves 250, and the first grooves 250 are disposed in the first direction (the 'z' direction). Further, the second grooves 412 and 414 are disposed on the light incidence plane 402 upon which light generated from the light source groups 242, 244 and 246 is incident. Namely, the second grooves 412 and 414 are disposed at portions of the light guide plate 400 overlapping in the second direction (the 'x' direction) with regions between the adjacent light source groups 242 and 244 and between the adjacent light source groups 244 and 246.

Figure 11:
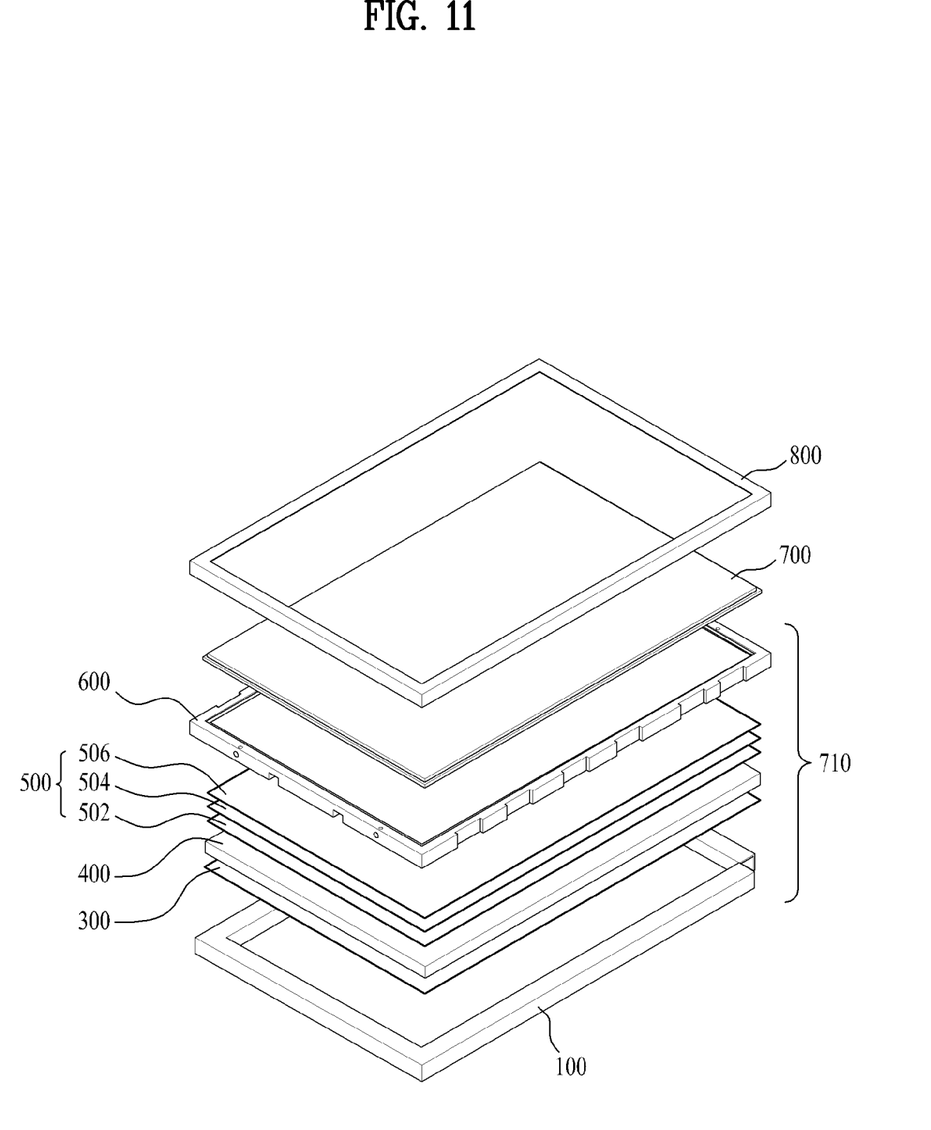
FIG. 11 is a view illustrating a display apparatus in accordance with one embodiment.

FIG. 11 is a view illustrating a display apparatus in accordance with one embodiment.

A bottom cover 100, a reflector 300, a light guide plate 400, an optical member 500 and a panel guide 600 of a backlight unit 710 shown in FIG. 11 are the same as those shown in FIG. 2, and a detailed description thereof will thus be omitted. Particularly, the light guide plate 400 shown in FIG. 11 includes the aforementioned second grooves.

A liquid crystal display panel 700 shown in FIG. 11 is disposed on the upper surface (or the front surface) of the optical member 500 and is supported by the panel guide 600. The liquid crystal display panel 700 has a structure in which a liquid crystal layer is disposed between both glass substrates and polarizing plates are respectively mounted on the glass substrates to utilize polarization of light. Here, the liquid crystal layer has intermediate properties between a liquid and a solid in which organic molecules having fluidity like a liquid, i.e., liquid crystals, are regularly disposed, and displays an image using change of molecular arrangement by application of an external electric field. A color filter (not shown) may be disposed on the front surface of the liquid crystal display panel 700.

The optical member 500 may include a diffusion sheet 502 to diffuse light emitted from the light guide plate 400, and a prism sheet 504 to perpendicularly emit light incident from the diffusion sheet 502 and to guide the light to a light emission area. Two or three of the diffusion and prism sheets 502 and 504 may be properly combined, and a combination sequence is not limited. For example, the optical member 500 may include only the diffusion sheet 502 and the prism sheet 504, or may further include other functional sheets according to embodiments. For example, a diffusion plate may be inserted between the light guide plate 400 and the optical member 500.

Further, the optical member 500 may further include a protective sheet 506 disposed on the diffusion sheet 502 or the prism sheet 504. The protective sheet 506 serves to protect the diffusion sheet 502 and the prism sheet 504 which are sensitive to dust or scratches and to prevent movement of the diffusion sheet 502 and the prism sheet 504 when the backlight unit 710 is conveyed.

As is apparent from the above description, a backlight unit and a display apparatus using the same in accordance with one embodiment may prevent generation of hot spots and dark regions, particularly, during local dimming in which driving of light emitting devices is divisionally controlled according regions.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A backlight unit, comprising:
a plurality of light source groups, each of the plurality of light source groups including at least one light source; and
a light guide plate to guide light irradiated from the plurality of light source groups, the plurality of light source groups being disposed opposite to a light incidence plane of the light guide plate,
wherein the light guide plate includes:
first grooves disposed in a first direction, the plurality of light source groups being disposed within the first grooves; and
at least one second groove disposed in a second direction differing from the first direction on the light incidence plane of the light guide plate, and
wherein the light source includes a semiconductor light emitting device.

2. The backlight unit according to claim 1, wherein the first grooves are disposed on the lower surface of the light guide plate, and the second direction is perpendicular to the first direction.

3. The backlight unit according to claim 2, further comprising optical member disposed on the front surface of the light guide plate,
wherein the second direction is perpendicular to a direction in which the optical member is seen.

4. The backlight unit according to claim 1, wherein the at least one light source includes a plurality of light sources, and the at least one second groove is disposed at portion of the light guide plate overlapping in the second direction with region between the plurality of light sources in each of the plurality of light source groups.

5. The backlight unit according to claim 1, wherein the at least one second groove is disposed at portion of the light guide plate overlapping in the second direction with region between the plurality of light source groups.

6. The backlight unit according to claim 5, wherein each of the plurality of light source groups includes:
a circuit board; and
a plurality of light sources disposed on the circuit board.

7. The backlight unit according to claim 6, wherein the at least one second groove is disposed at portion of the light guide plate overlapping in the second direction with region between light sources located at respective edges of the plurality of adjacent light source groups.

8. The backlight unit according to claim 7, wherein the at least one second groove is disposed at portion of the light guide plate overlapping in the second direction with region between respective circuit boards of the plurality of adjacent light source groups.

9. The backlight unit according to claim 5, wherein the plurality of light source groups includes:
a circuit board; and
a plurality of light sources divided from each other on the circuit board according to local dimming units.

10. The backlight unit according to claim 9, wherein the at least one second groove is disposed at portion of the light guide plate overlapping in the second direction with region between light sources located at respective edges of the adjacent local dimming units.

11. The backlight unit according to claim 5, wherein the plurality of light source groups includes:
   a plurality of sub-circuit boards; and
   a plurality of light sources disposed on each of the plurality of sub-circuit boards,
   wherein the plurality of sub-circuit boards is disposed on a main circuit board.

12. The backlight unit according to claim 11, wherein the at least one second groove is disposed at portion of the light guide plate overlapping in the second direction with region between light sources located at respective edges of the adjacent sub-circuit boards, or is disposed at portion of the light guide plate overlapping in the second direction with region between the adjacent sub-circuit boards.

13. The backlight unit according to claim 1, wherein a ratio of the depth to the width of the at least one second groove is 3:1 to 2:1.

14. The backlight unit according to claim 1, wherein the width of the at least one second groove is 5.375 mm or less.

15. The backlight unit according to claim 1, wherein the at least one second groove has a circular cross-section, and has a radius adapted to refract in the second direction light irradiated from the plurality of light source groups.

16. The backlight unit according to claim 1, wherein the at least one second groove has a triangular cross-section, and the central angle of the at least one second groove is 30° or less.

17. The backlight unit according to claim 1, wherein the at least one second groove includes first and second inclined planes meeting at an inflection point.

18. The backlight unit according to claim 17, wherein the first and second inclined planes are convex or concave with respect to the inside of the at least one second groove.

19. The backlight unit according to claim 17, wherein the first and second inclined planes have a curvature adapted to refract in the second direction light irradiated from the plurality of light source groups.

20. A display apparatus, comprising:
   a display panel; and
   a backlight unit for irradiating light onto the display panel, wherein the backlight unit includes:
      a plurality of light source groups, each of the plurality of light source groups including at least one light source; and
      a light guide plate to guide light irradiated from the plurality of light source groups, the plurality of the light source groups being disposed opposite to a light incidence plane of the light guide plate,
   wherein the light guide plate includes:
      first grooves disposed in a first direction, the plurality of light source groups being disposed within the first grooves; and
      at least one second groove disposed in a second direction differing from the first direction on the light incidence plane of the light guide plate.

* * * * *